(12) United States Patent
Cleofe et al.

(10) Patent No.: US 8,559,782 B2
(45) Date of Patent: Oct. 15, 2013

(54) CONDUCTOR ASSEMBLY, CONDUCTOR SPACER AND ASSOCIATED METHOD OF SEPARATING CONDUCTORS

(75) Inventors: Jaures Floyd Cleofe, Seattle, WA (US); Norman Bradley Cooper, Everett, WA (US); Lyudmila Hunter, Snohomish, WA (US); Tracey Anne Johnson, Mukilteo, WA (US); Cole James Kronberg, Mukilteo, WA (US); Lenny Lay, Stanwood, WA (US); Thomas Taylor, Seattle, WA (US); Kenneth Lee Wilson, Arlington, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 12/943,961

(22) Filed: Nov. 11, 2010

(65) Prior Publication Data

US 2012/0121227 A1    May 17, 2012

(51) Int. Cl.
*G02B 6/00*    (2006.01)
*B65D 3/00*    (2006.01)
*A44B 11/25*   (2006.01)

(52) U.S. Cl.
USPC ............ 385/134; 385/136; 24/16 PB; 24/339

(58) Field of Classification Search
USPC ............... 24/16 PB, 335, 339; 385/134, 136; 248/62, 74.3, 69, 229.17
See application file for complete search history.

(56) References Cited

U.S. PATENT DOCUMENTS

| | | | | |
|---|---|---|---|---|
| 6,247,192 B1 * | 6/2001 | Bostoen | ............................ | 4/415 |
| 7,131,168 B2 * | 11/2006 | Pangallo | ..................... | 24/16 PB |
| 7,946,091 B1 * | 5/2011 | Wisniewski | ................. | 52/741.1 |
| 2002/0071715 A1 | 6/2002 | Geiger | | |

FOREIGN PATENT DOCUMENTS

GB    2 330 458 A    4/1999

OTHER PUBLICATIONS

European Search Report for Application No. EP 11 18 8856 dated Mar. 19, 2012.
*CR4H-M: Connect Multiple Wire Bundles or Hang Bundles from Conduit Eliminating the Need for Saddle Clamps* [online][retrieved Jul. 29, 2010] Retrieved from the Internet: <URL: http://www.panduit.com/Products/ProductOverviews/ProductSearch/index.htm?Nu=P_Rol...> (1 page).

(Continued)

*Primary Examiner* — Omar Rojas
(74) *Attorney, Agent, or Firm* — Alston & Bird LLP

(57) ABSTRACT

A conductor assembly, a conductor spacer and an associated method for separating conductors are provided in order to secure conductors to one another and/or to an underlying platform. A conductor assembly includes a spacer body having a prismatic solid shape, first and second conductors that extend alongside the spacer body and first and second ties for securing the conductors to the spacer body. The spacer body includes a pair of end faces and a plurality of side faces extending between the end faces. The spacer body also defines an internal cavity that is accessible via openings defined by the end faces and at least two of the side faces. The spacer body is configured to provide different spacings between the conductors when the ties extend through different ones of the openings.

20 Claims, 14 Drawing Sheets

(56) References Cited

OTHER PUBLICATIONS

*CR4H-M0: Connect Multiple Wire Bundles or Hang Bundles from Conduit Eliminating the Need for Saddle Clamps* [online][retrieved Jul. 29, 2010] Retrieved from the Internet: <URL: http://www.panduit.com/Products/ProductOverviews/ProductSearch/index.htm?Nu=P_Rol...> (1 page).

\* cited by examiner

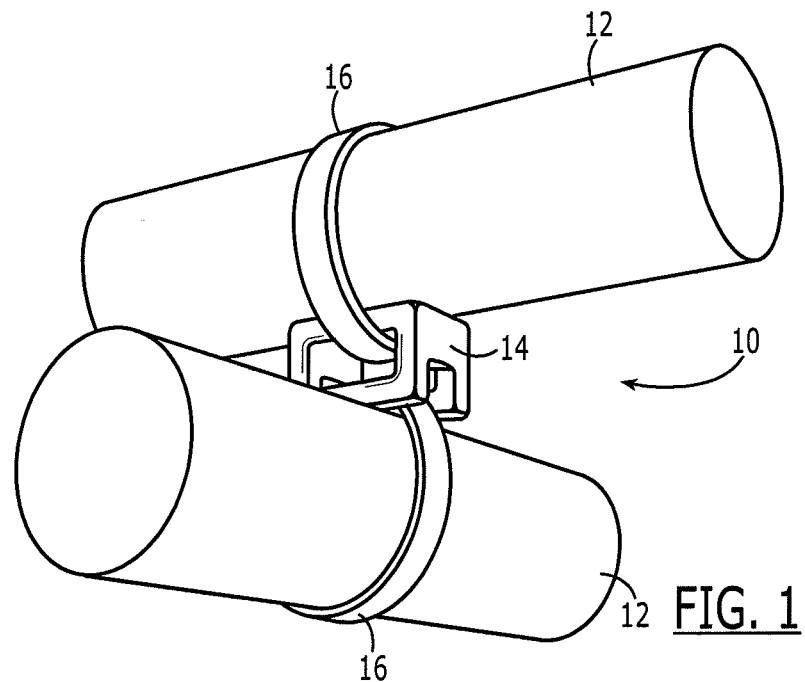
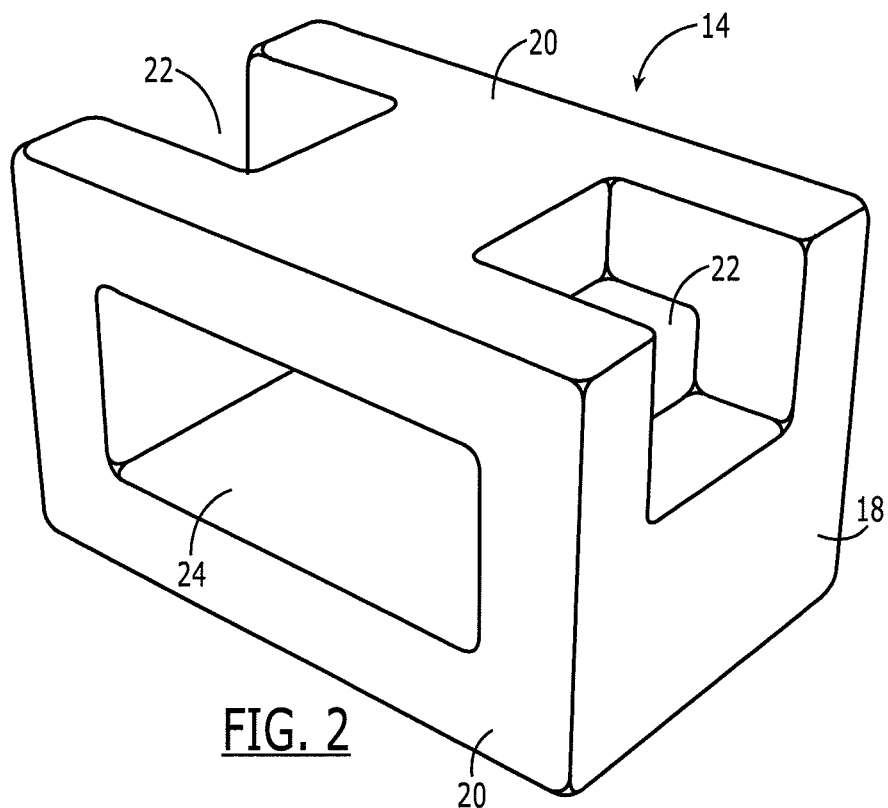

CONDUCTOR ASSEMBLY, CONDUCTOR SPACER AND ASSOCIATED METHOD OF SEPARATING CONDUCTORS

TECHNOLOGICAL FIELD

Embodiments of the present disclosure relate generally to the maintenance of a desired separation or spacing between conductors and, more particularly, to a spacer for maintaining a desired space separation or spacing between conductors disposed in various orientations relative to one another, such as in either parallel or orthogonal orientations relative to one another.

BACKGROUND

A number of different platforms include conductors, wire harnesses, optical fibers or the like (hereinafter generally referenced as "conductor(s)") routed therethrough. For example, vehicles, such as aircraft, automobiles, ships and the like generally include a relatively large number of conductors routed throughout the vehicle. Similarly, buildings generally include a plurality of conductors routed therethrough.

In order to maintain the desired separation between conductors, to avoid contact and abrasion between the conductors, to facilitate heat dissipation from the conductors and to otherwise efficiently manage the routing of the conductors, conductors are oftentimes tied down or otherwise held in position relative to the underlying platform and to other conductors. Conductors may be tied down in various manners. For example, clamps may be utilized to secure conductors to the underlying platform. However, clamps may be larger, heavier and/or more expensive than desired in some applications. In addition to or instead of clamps, tape may be utilized to secure conductors in position relative to the underlying platform. However, the application of one or more layers of tape to a conductor may undesirably increase the installation time in some situations.

As noted above in conjunction with the clamps and tape that may be utilized to secure a conductor to the underlying platform, techniques for securing conductors must generally take into account a multitude of factors including material costs, labor, weight, size and installation time. Moreover, the techniques for securing conductors to an underlying platform may be further complicated by the plurality of different orientations which conductors may have with respect to one another, such as parallel orientations, orthogonal orientations and the like, as well as different spacings that are to be maintained between conductors.

BRIEF SUMMARY

A conductor assembly, a conductor spacer and an associated method for separating conductors are provided according to one embodiment of the present disclosure in order to provide an improved technique for securing conductors to one another, to an underlying platform or the like. In this regard, the conductor assembly, conductor spacer and associated method may permit conductors to be secured to one another in different orientations, including a parallel orientation and an orthogonal orientation. Additionally, the conductor assembly, conductor spacer and associated method of one embodiment permit conductors to be secured to one another with different predefined spacing being provided between the conductors.

In one embodiment, a conductor assembly is provided that includes a spacer body having a prismatic solid shape, first and second conductors that extend alongside the spacer body and first and second ties for securing the first and second conductors, respectively, to the spacer body. The spacer body of this embodiment includes a pair of end faces and a plurality of side faces extending between the pair of end faces. The spacer body also defines an internal cavity that is accessible via openings defined by each of the end faces and at least two of the side faces. In this regard, the first and second ties extend through the pair of openings and the internal cavity defined by the spacer body. The spacer body is configured to provide a first spacing between the first and second conductors when the first and second ties extend through the openings defined by the side faces and encircle respective end faces. Additionally, the spacer body is configured to provide a second spacing, different than the first spacing, between the first and second conductors when the first and second ties extend through a pair of openings and encircle respective side faces.

The spacer body of one embodiment defines openings in a pair of opposed side faces as well as a pair of openings extending about respective corners between a side face and an end face such that each of the pair of openings is defined partially by a side face and partially by an end face. For example, the pair of openings of this embodiment may be defined by a common side face and by the pair of opposed end faces. The first and second ties of one embodiment may extend through respective pairs of openings with one pair of openings being orthogonally oriented relative to the other pair of openings. A spacer body may include at least four side faces extending between the pair of end faces with each of the at least four side faces defining a respective opening to the internal cavity. The openings defined by at least two side faces may be orthogonal to one another. The openings defined by the end faces may be orthogonal to the openings defined by the at least two side faces. In one embodiment, the end faces have a respective height and width with the height of the end faces differing from the width of the end faces.

In another embodiment, a conductor spacer is provided that includes a spacer body having a prismatic solid shape and comprising a pair of end faces and a plurality of side faces extending between the pair of end faces. The spacer body of this embodiment defines an internal cavity that is accessible via openings defined by each of the end faces and at least two of the side faces. The end faces have different dimensions than the side faces.

The spacer body of one embodiment defines openings in a pair of opposed side faces as well as a pair of openings extending about respective corners between a side face and an end face such that each of the pair of openings is defined partially by a side face and partially by an end face. For example, the pair of openings of this embodiment may be defined by a common side face and by the pair of opposed end faces. The spacer body may include at least four side faces extending between the pair of end faces. Each of the at least four side faces may define a respective opening to the internal cavity. In one embodiment, the openings defined by the at least two side faces are orthogonal to one another. The openings defined by the end faces may be orthogonal to the openings defined by the at least two side faces. In one embodiment, the end faces have a respective height and width with the height of the end faces differing from the width of the end faces.

In a further embodiment, a method of separating conductors is provided in which a spacer body having a prismatic solid shape is positioned between first and second conductors and the first and second conductors are then secured to the spacer body with first and second ties, respectively. The spacer body of this embodiment includes a pair of end faces and a plurality of side faces extending between the pair of end faces. The spacer body of this embodiment also defines an internal cavity that is accessible via openings defined by each of the end faces and at least two of the side faces. As such, the first and second ties that secure the first and second conductors, respectively, to the spacer body extend through the openings and the internal cavity defined by the spacer body. The spacer body is positioned in accordance with this embodiment so as to provide a first spacing between first and second conductors when the first and second ties extend through the openings defined by the side faces and encircle respective end faces and a second spacing, different than the first spacing, between the first and second conductors when the first and second ties extend through a pair of openings and encircle respective side faces.

The spacer body of one embodiment defines openings in a pair of opposed side faces as well as a pair of openings extending about respective corners between a side face and an end face such that each of the pair of openings is defined partially by a side face and partially by an end face. For example, the pair of openings of this embodiment may be defined by a common side face and by the pair of opposed end faces. In securing the first and second conductors to the spacer body, the first and second conductors of one embodiment may be positioned in an orthogonal orientation and the first and second ties may be extended through respective pairs of openings with one pair of openings being orthogonally orientated relative to the other pair of openings. In one embodiment, the method may provide the spacer body such that the openings defined by the at least two side faces are orthogonal to one another. In one embodiment, the method may provide the spacer body such that the openings defined by the end faces are orthogonal to the openings defined by the at least two side faces. In regards to positioning the spacer body, the spacer body may be provided to have end faces with a respective height and width with the height of the end faces differing from the width of the end faces so as to provide for the first and second spacings between the first and second conductors depending upon the positioning of the spacer body.

In accordance with embodiments of the present disclosure, a conductor spacer may be provided that facilitates the relative positioning and spacing of a pair of conductors in a manner that accommodates different orientations and different spacings between the conductors. However, the features, functions and advantages that have been discussed may be achieved independently in various embodiments of the present disclosure and may be combined in the other embodiments, further details of which may be seen with reference to the following description and drawings.

BRIEF DESCRIPTION OF THE SEVERAL VIEWS OF THE DRAWING(S)

Having thus described embodiments of the disclosure in general terms, reference will now be made to the accompanying drawings, which are not necessarily drawn to scale, and wherein:

FIG. 1 is a perspective view of a conductor assembly in accordance with one embodiment of the present disclosure;

FIG. 2 is a perspective view of a conductor spacer in accordance with one embodiment of the present disclosure;

DETAILED DESCRIPTION

Figure 3:
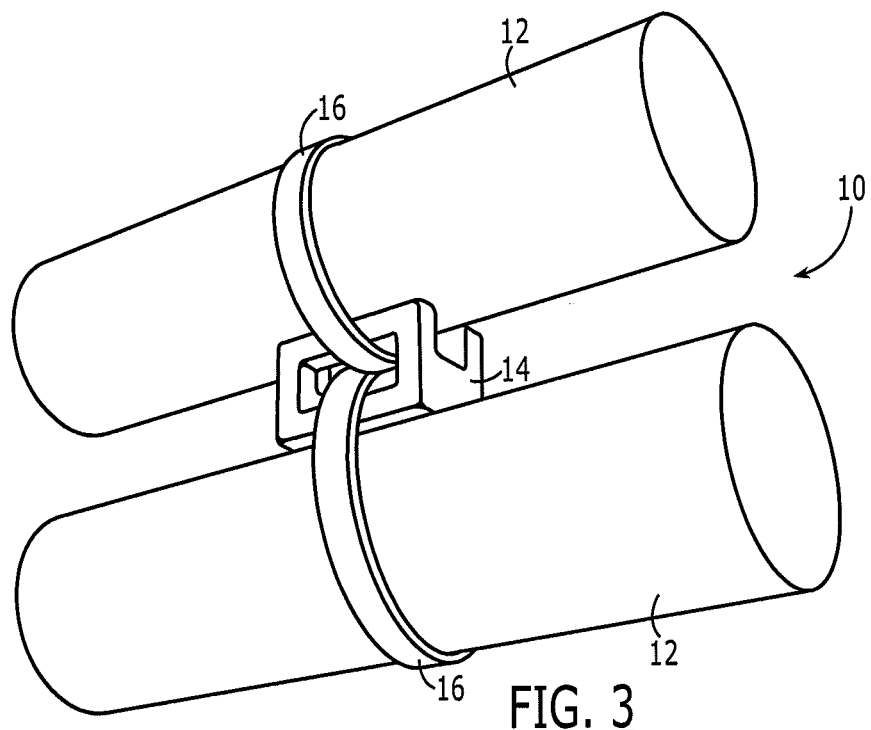
FIG. 3 is a perspective view of a conductor spacer and a pair of ties that are oriented relative to the conductor spacer to permit the respective conductors to be oriented in a parallel orientation with a smaller separation between the conductors in accordance with one embodiment of the present disclosure.

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a conductor assembly 10 according to one embodiment of the present disclosure is illustrated. The conductor assembly 10 includes a conductor spacer 14, first and second conductors 12 that extend alongside the conductor spacer and first and second ties 16 for securing the first and second conductors, respectively, to the conductor spacer. In the illustrated embodiment, the first and second conductors 12 are oriented in an orthogonal relationship to one another. However, the conductor spacer 14 supports the first and second conductors 12 being positioned in different orientations relative to one another, such as in a parallel relationship with one another. The first and second conductors 12 may be any of a wide variety of conductors including wire harnesses, wire bundles, wires, cables, optical fibers or the like and (hereinafter referenced generically as "conductor(s)"). Additionally, the first and second ties 16 that secure the first and second conductors 12, respectively, to the conductor spacer 14 may be any of a variety of different ties. For example, the ties may be tie straps, lacing tape or the like.

Regardless of the type of conductor 12 and the type of tie 16, the conductor spacer 14 provides a predefined spacing or separation between the conductors, thereby maintaining a desired separation between the conductors and avoiding abrasion between the conductors. By spacing the conductors, the conductor spacer 14 also advantageously facilitates heat dissipation from the conductors 12. Additionally, the conductor spacer 14 maintains the relative orientation of the first and second conductors 12 with respect to one another, such as in a parallel configuration or an orthogonal configuration, so that the conductors may be routed in the desired fashion in a controlled manner throughout the platform, such as a vehicle, a building or the like.

Figure 15:
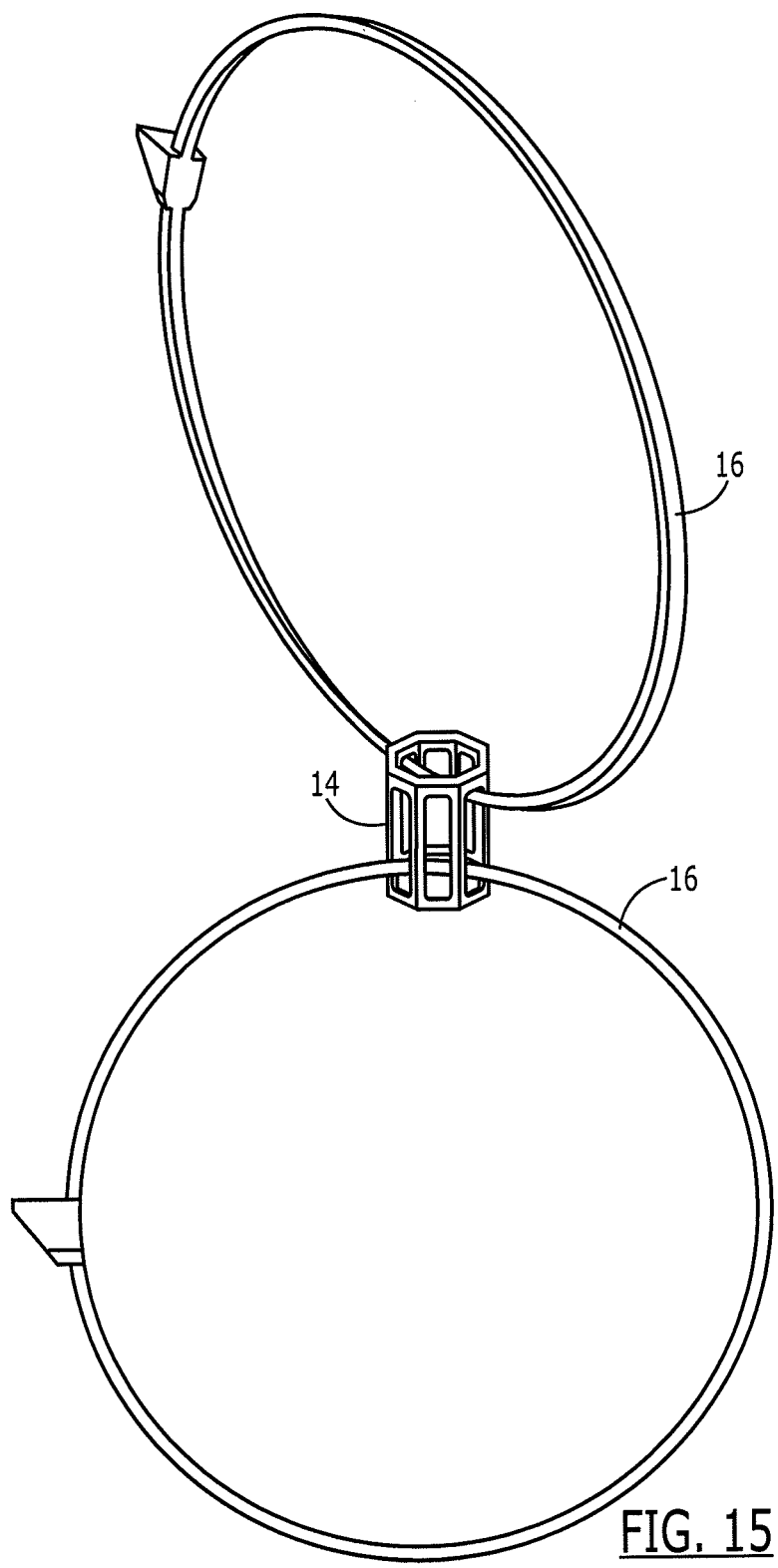
FIG. 15 is a perspective view of a conductor assembly of a further embodiment in which the conductor spacer has six side faces.

As shown in more detail in FIG. 2, the conductor spacer 14 has a spacer body with a prismatic solid shape. In one embodiment, the prismatic solid shape of the spacer body may be a rectangular solid shape. However, the conductor spacer 14 may have other prismatic solid shapes, such as hexagonal solid shapes or octagonal solid shapes, in other embodiments as shown, for example, in FIG. 15. In order to facilitate the manufacture of the spacer body and the routing of ties 16 across and along the spacer body, a spacer body may include radiused edges such that the prismatic solid shape encompasses not only a prismatic solid shape having linear edges but also a generally prismatic solid shape having radiused or rounded edges, such as shown in FIG. 2.

The conductor spacer 14 may be formed of various materials. In one embodiment, the conductor spacer 14 is formed of a material that is insulative or otherwise not electrically conductive so as maintain electrical separation between the conductors 12. The conductor spacer 14 may also be formed of a material that is non-abrasive so as to limit abrasion or other damage to the conductors 12 as a result of contact between the conductor spacer and the conductors. In one embodiment, the conductor spacer 14 may be formed of polyetheretherketone (PEEK). However, the conductor spacer 14 may be formed of other materials in other embodiments.

The spacer body includes a pair of end faces 18 and a plurality of side faces 20 that extend between the pair of end faces. In the illustrated embodiment in which the conductor spacer 14 is a rectangular solid, the spacer body includes four side faces 20 that extend between the pair of end faces 18. As a result of the rectangular solid shape of the spacer body in the illustrated embodiment, however, each side face 20 is orthogonal to the adjacent side faces. Additionally, each side face 20 is orthogonal to each of the end faces 18. However, the spacer body may include different numbers of side faces 20 in embodiments in which the prismatic spacer body is not a rectangular solid. In these embodiments, the side faces 20 may no longer be orthogonal to one another. However, the side faces 20 of these other embodiments generally remain orthogonal to each of the end faces 18.

The spacer body defines an internal cavity. Additionally, the spacer body defines openings 22 at least partially defined by each of the end faces 18 and openings 24 through at least two of the side faces 20. In the illustrated embodiment, the spacer body defines openings 24 through a pair of opposed side faces 20, with one of the other side faces at least partially defining the openings 22 as described below and the remaining side face being free of or without any opening. As noted above, the space body also defines a pair of openings 22 that extend about respective corners between a side face 20 and an end face 18. Thus, each opening 22 is defined partially by a side face 20 and partially by an end face 18. In the illustrated embodiment, one of the openings 22 is partially defined by one of the end faces 18 and the other one of the openings is partially defined by the other one of the end faces. However, both of the openings 22 in the illustrated embodiment are partially defined by the same or a common side face 20.

As a result, the internal cavity is accessible via the openings 22, 24 defined by the end faces 18 and the side faces 20. In order to permit ties 16 to extend through the openings as described below while limiting the risk of damage to the ties 16, the side faces 20 and the end faces 18 may define radiused edges that lead into or define the openings. Thus, the ties 16 may be readily pulled about the conductor spacer 14 and through the openings without damage to the ties.

The conductor spacer 14 has a prismatic solid shape as noted above and has a rectangular solid shape in the illustrated embodiment, but is not a cube. Instead, the length of the spacer body between the pair of end faces 18 is different than the width of the end faces. In one embodiment, for example, the length of the spacer body may be at least 150% of the width of the end faces 18, while in another embodiment, the length of the spacer body is at least 200% of the width of the end faces. Since the spacer body has a different length and width, the conductor spacer 14 may provide different amounts of separation between the first and second conductors 12 depending upon the orientation of the conductor spacer relative to the first and second conductors. As described in more detail below, a conductor spacer 14 will provide more separation between conductors 12 that extend along the end faces 18 and are therefore separated by the length of the spacer body than conductors that extend along the side faces 20 and are therefore separated by the width of the end faces. By providing different amounts of separation between the conductors 12 depending upon its orientation of the conductor spacer 14, a single conductor spacer may provide flexibility during the installation of conductors.

As noted above with respect to FIG. 1, the conductor assembly 10 secures first and second conductors 12 to the spacer body with the first and second conductors being positioned orthogonally relative to one another. In this orientation, the conductor ties 16 are oriented relative to the conductor spacer 14 so as to secure first and second conductors 12 to the conductor spacer with the first and second conductors being orthogonally oriented relative to one another. In order to secure a pair of orthogonally oriented conductors 12 to the conductor spacer 14, the first and second ties 16 extend through respective pairs of the openings that are also orthogonally oriented relative to one another. Indeed, one of the ties 16 extends through the openings 24 defined by the opposed side faces 20 and encircles a respective side face, namely, the side face that is free of openings. In this embodiment, the other tie 16 extends through the openings 22 extending about respective corners between the opposed end faces 18 and a side face 20, thereby resulting in the ties being oriented orthogonally relative to one another.

As also described above, the conductor assembly 10 of one embodiment of the present disclosure also permits conductors 12 to be secured to the conductor spacer 14 in an instance in which the conductors are oriented parallel to one another. As shown in FIG. 3, for example, the first and second ties 16 of a conductor assembly 10 of this embodiment may extend through the same pair of openings, such as the same pair of openings 24 defined by opposed side faces 20 with the conductor spacer 14 and the ties may be oriented such that the ties encircle opposed side faces, thereby positioning the ties relative to the conductor spacer such that the conductors are secured to the conductor spacer in a parallel orientation.

Figure 4:
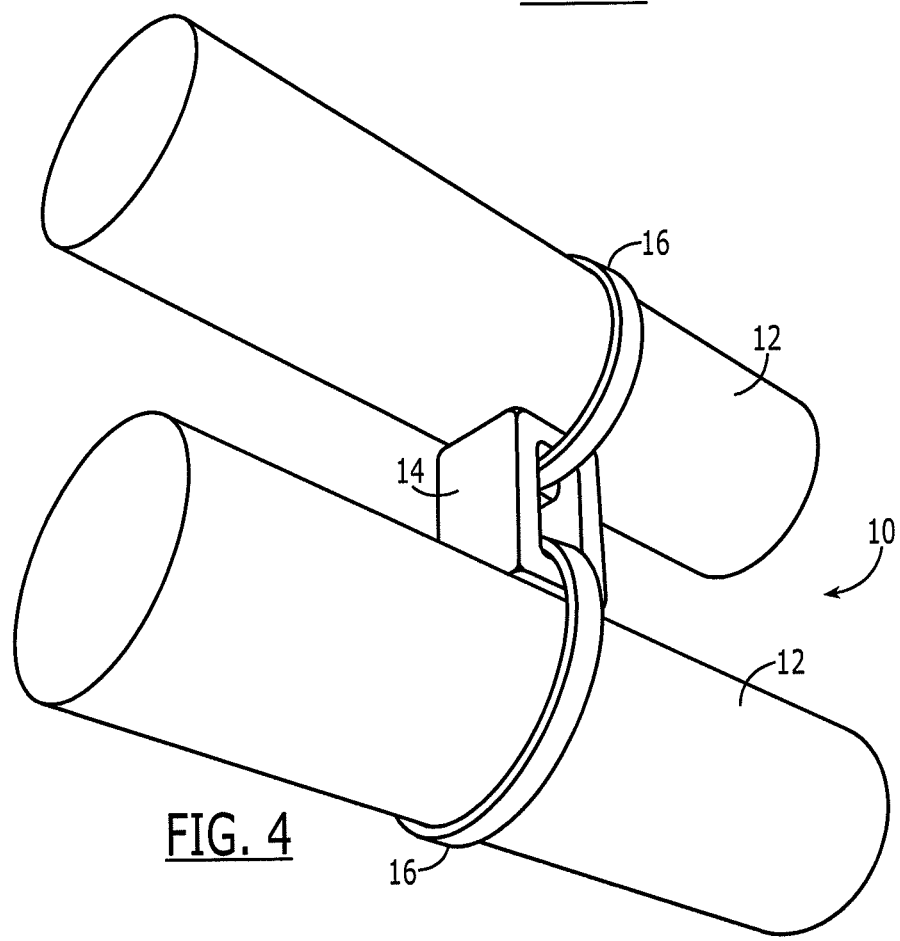
FIGS. 4 and 5 are perspective views of a conductor spacer and a pair of ties that are oriented relative to the conductor spacer to permit the respective conductors to be oriented in a parallel orientation with a larger separation between the conductors in accordance with one embodiment of the present disclosure.
Figure 5:
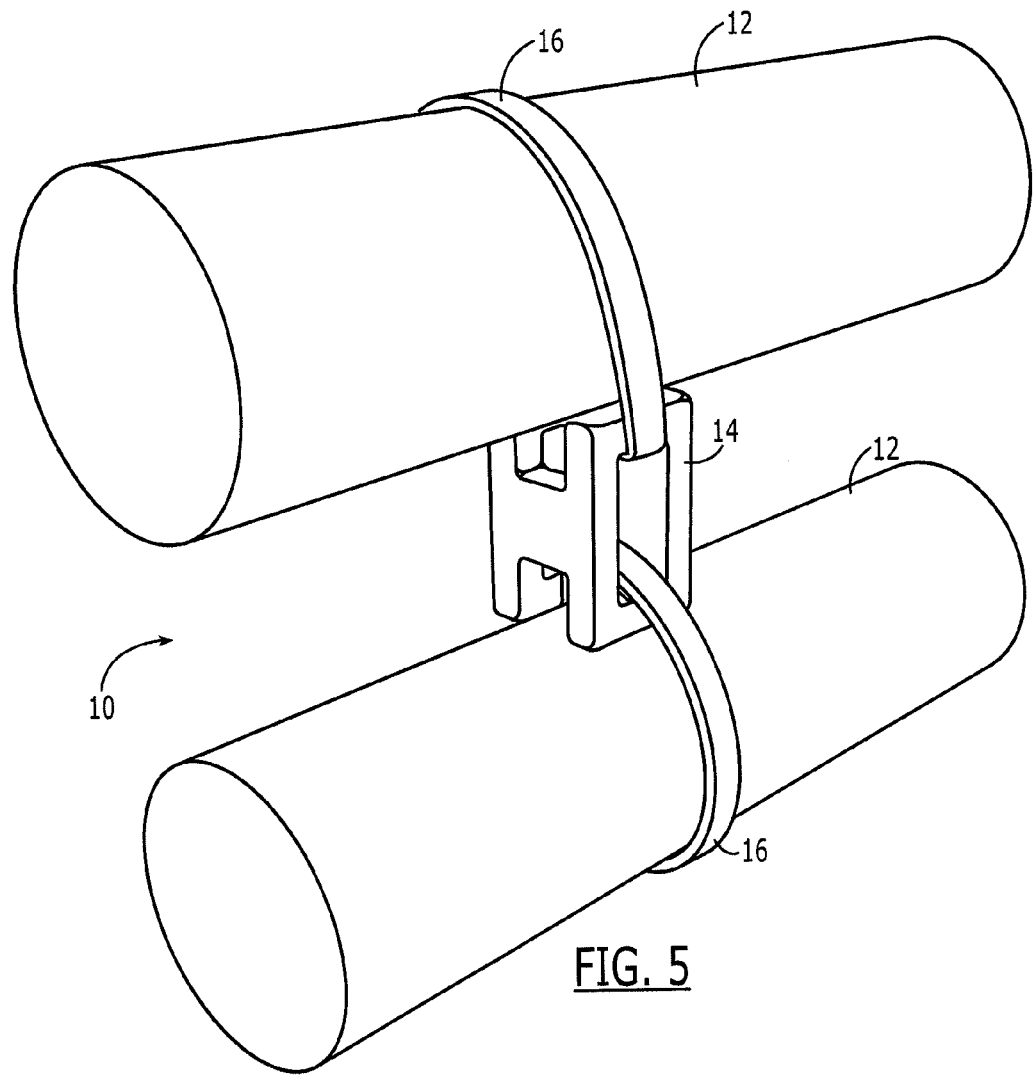

The conductor spacer 14 may also be configured to provide different amounts of separation between the first and second parallel conductors 12. In the embodiment of FIG. 3, for example, the conductor spacer 14 is oriented with the ties 16 extending through openings 24 defined by the side faces 20 and encircle the opposed side faces such that the first and second conductors 12 are separated by a smaller distance as defined by the width of the spacer body between the pair of side faces. In another embodiment as shown in FIGS. 4 and 5, the ties 16 extend through the same pair of openings 24 defined by the opposed side faces 20, but the conductor spacer 14 and the ties are oriented such that the ties encircle the opposed end faces 18. Thus, the ties 16 are positioned relative to the conductor spacer 14 of this embodiment such that the conductors 12 are secured to the conductor spacer in a parallel orientation, but are separated from one another by a larger distance as defined by the length between the opposed end faces 18. Accordingly, the conductor spacer 14 of one embodiment facilitates the secure engagement of a pair of conductors 12 while permitting different orientations and different spacings between the pair of conductors.

Figure 6:
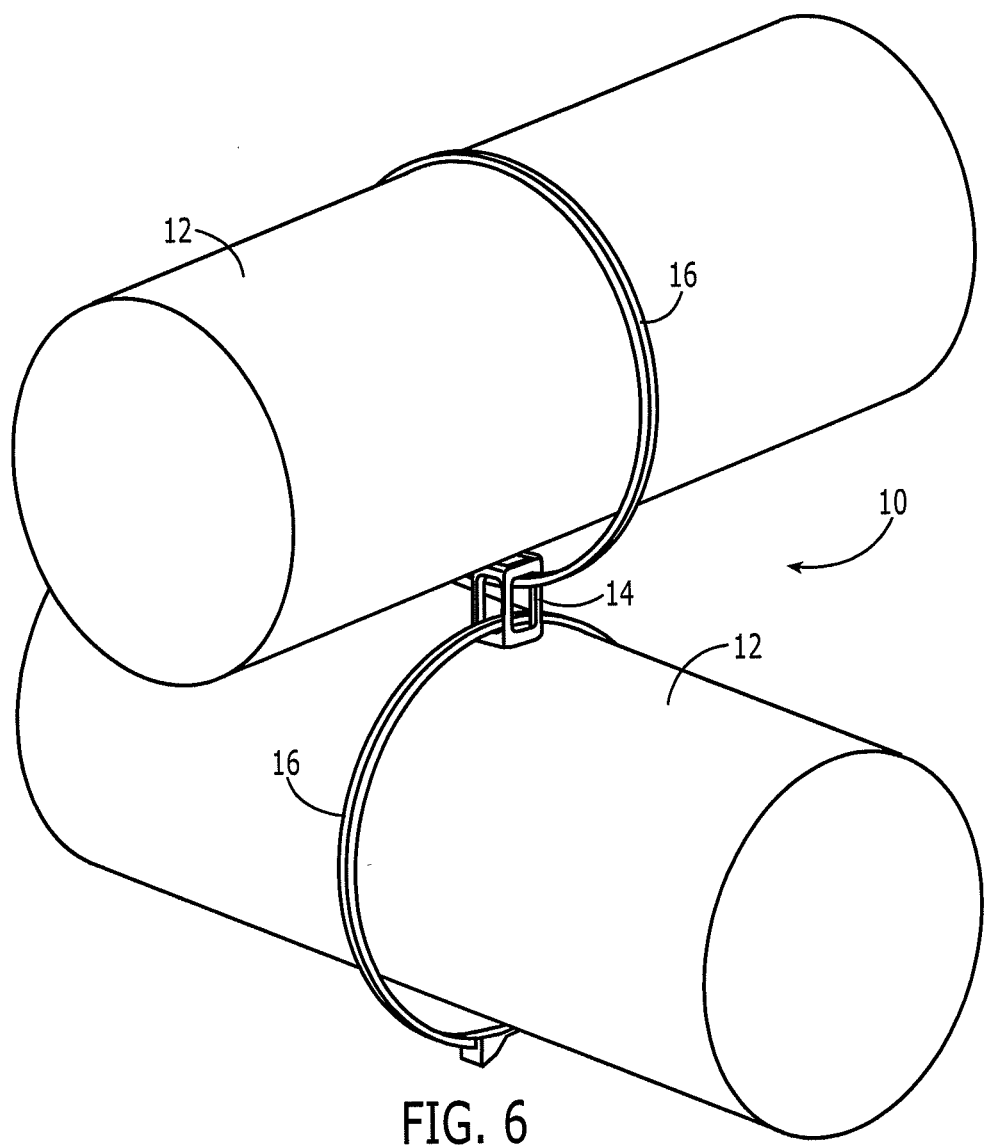
FIG. 6 is a perspective view of a conductor assembly in accordance with another embodiment of the present disclosure.

The conductor spacer 14 may have various configurations in accordance with embodiments of the present disclosure. By way of another example, a conductor assembly 10 according to another embodiment of the present disclosure is illustrated in FIG. 6. The conductor assembly 10 includes a conductor spacer 14, first and second conductors 12 that extend alongside the conductor spacer and first and second ties 16 for securing the first and second conductors, respectively, to the conductor spacer. In the illustrated embodiment, the first and second conductors 12 are oriented in an orthogonal relationship to one another. However, the conductor spacer 14 of this embodiment also supports the first and second conductors 12 being positioned in different orientations relative to one another, such as in a parallel relationship with one another.

Figure 7:
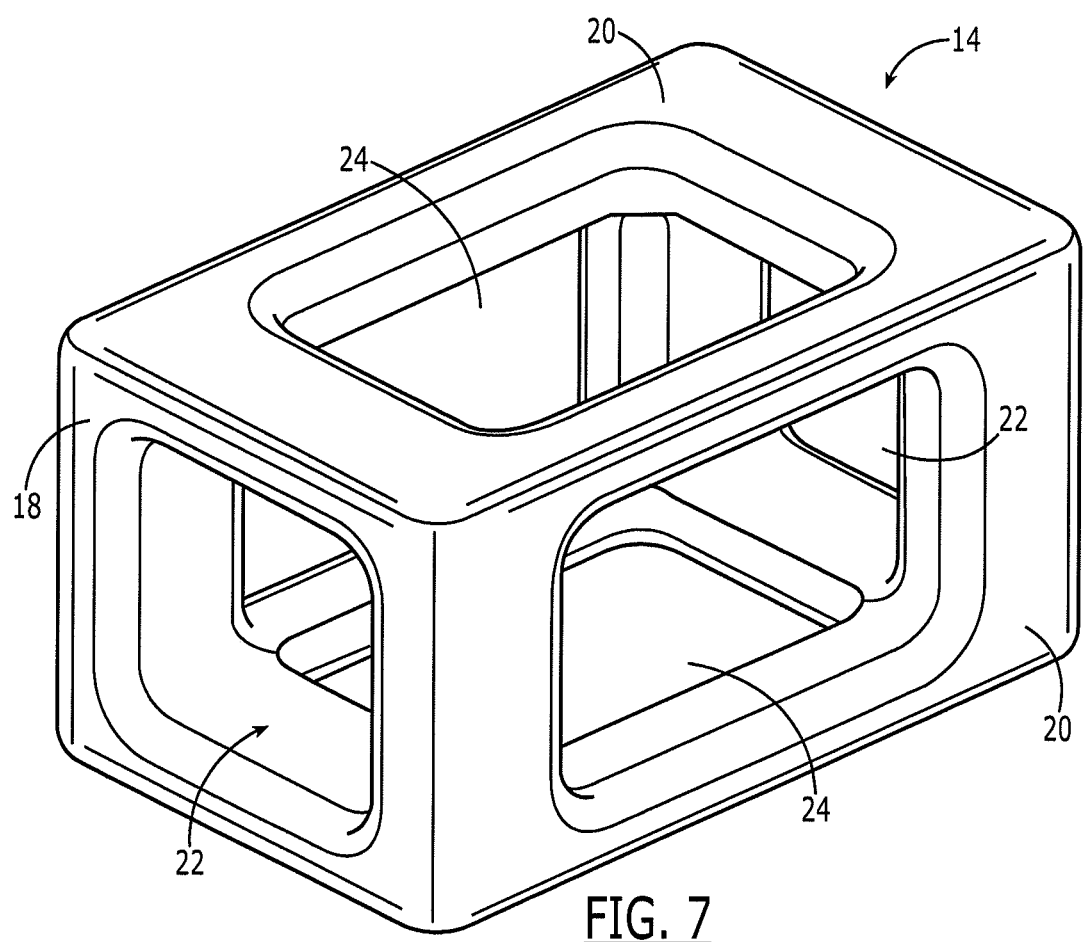
FIG. 7 is a perspective view of a conductor spacer in accordance with another embodiment of the present disclosure.

As shown in more detail in FIG. 7, the conductor spacer 14 has a spacer body with a prismatic solid shape, such as a rectangular solid shape. The spacer body of this embodiment also includes a pair of end faces 18 and a plurality of side faces 20 that extend between the pair of end faces, such as four side faces 20 that extend between the pair of opposed end faces 18. The spacer body defines an internal cavity. Additionally, the spacer body defines openings 22 at least partially defined by each of the end faces 18 and openings 24 through each of the side faces 20, such as each of the four side faces. As such, the internal cavity is accessible via the openings defined by the end faces 18 and the side faces 20.

Figure 8:
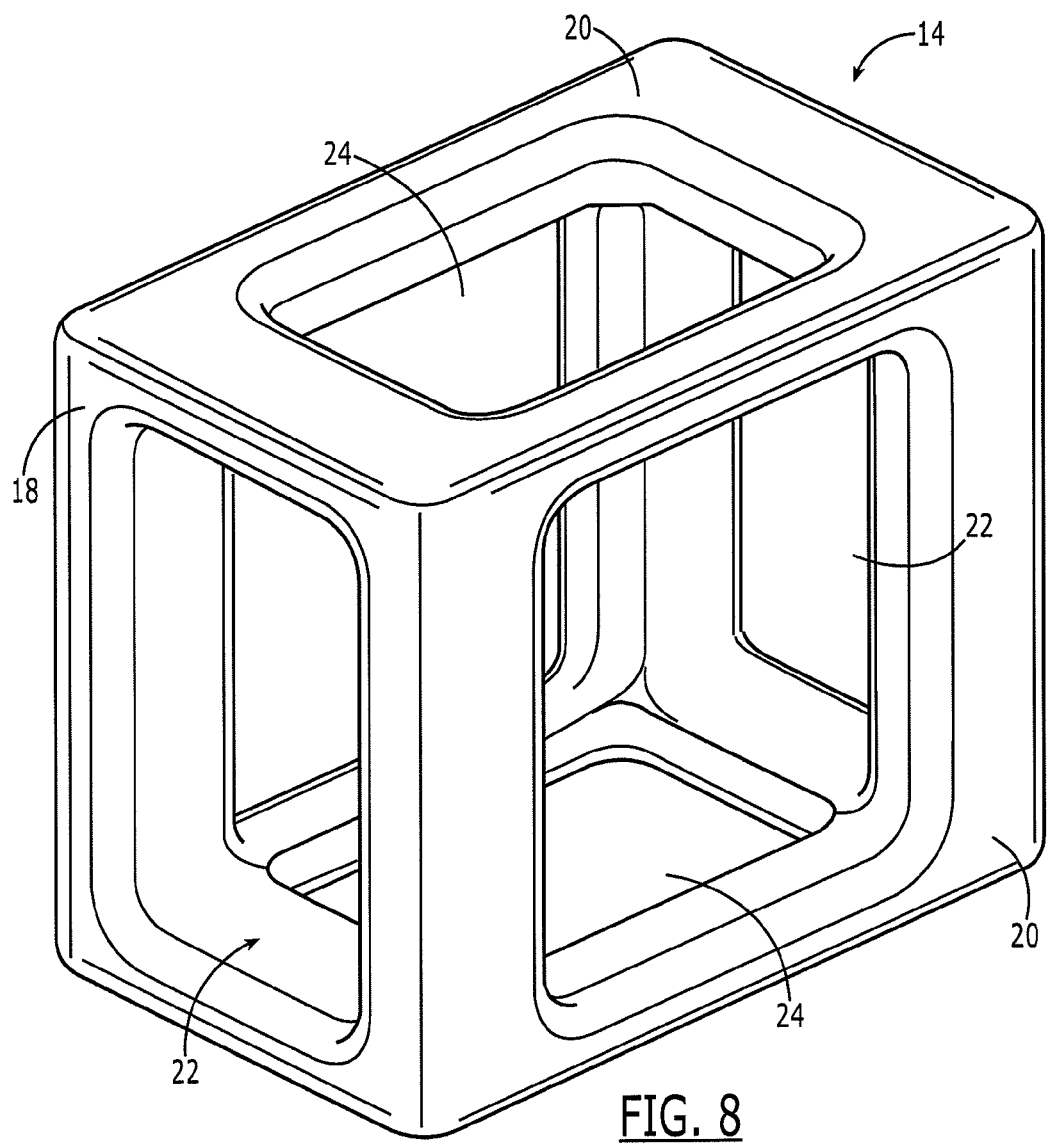
FIG. 8 is a perspective view of a conductor spacer in accordance with a further embodiment of the present disclosure.

While the conductor spacer 14 of the embodiment of FIG. 7 includes end faces 18 that are generally square, the end faces of a spacer body of other embodiments may not be square, but may have a width and a height that differ from one another. As shown in FIG. 8, the conductor spacer 14 of this embodiment may provide a third amount of separation between the first and second conductors 12 so that conductors that extend along the side faces 20 could be separated by a first distance in an instance in which the spacer body was oriented such that the first and second conductors were separated by the width of the end faces 18 and a different distance in an instance in which the first and second conductors are separated by the height of the end faces. Thus, the conductor spacer 14 of one embodiment provides at least two different amounts of separation between conductors 12 and, in one embodiment, provides three different amounts of separation.

Figure 9:
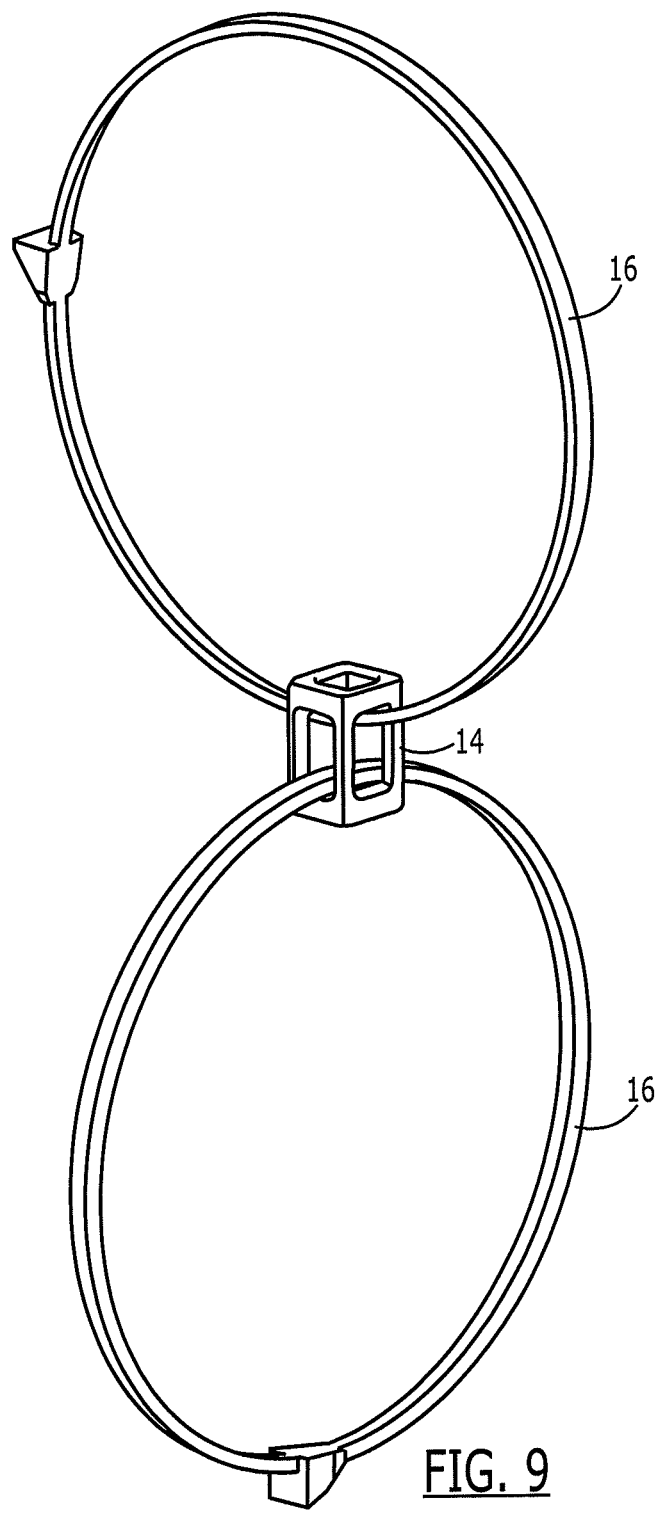
FIG. 9 is a perspective view of a conductor spacer and a pair of ties that are oriented relative to the conductor spacer to permit the respective conductors to be oriented in an orthogonal relationship with a larger separation between the conductors in accordance with one embodiment of the present disclosure.
Figure 10:
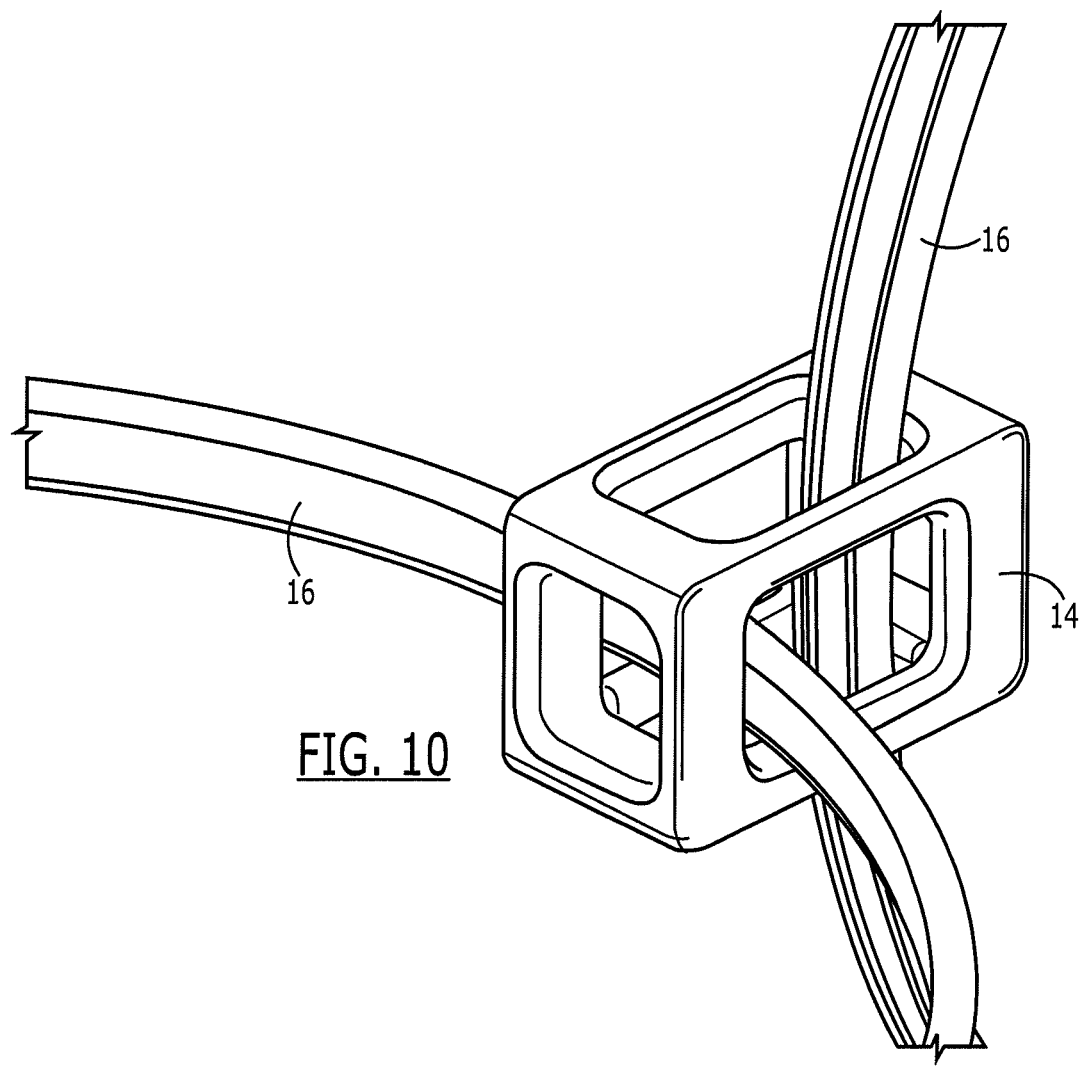
FIG. 10 is a fragmentary perspective view of the conductor spacer and the pair of ties of FIG. 9, which illustrates the manner in which the ties extend through the conductor spacer.

As noted above with respect to FIG. 6, the conductor assembly 10 secures first and second conductors 12 to the spacer body with the first and second conductors being positioned orthogonally relative to one another. By way of further explanation, reference is now made to FIGS. 9 and 10 in which a conductor spacer 14 and a pair of ties 16 are illustrated with the conductor ties oriented relative to the conductor spacer so as to secure first and second conductors to the conductor spacer with the first and second conductors being orthogonally oriented relative to one another. In order to secure a pair of orthogonally oriented conductors to the conductor spacer 14, the first and second ties 16 extend through respective pairs of the openings that are also orthogonally oriented relative to one another.

Figure 11:
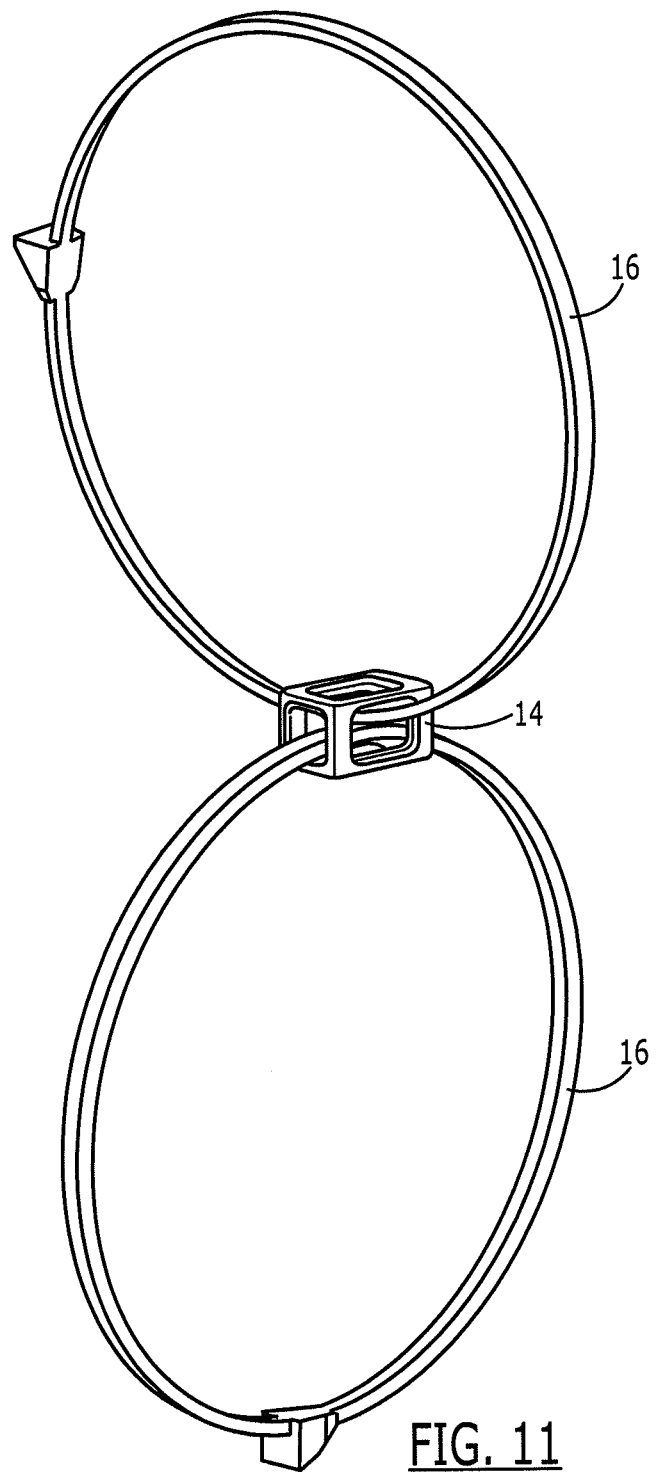
FIG. 11 is a perspective view of a conductor spacer and a pair of ties that are oriented relative to the conductor spacer to permit the respective conductors to be oriented in an orthogonal relationship with a smaller separation between the conductors in accordance with one embodiment of the present disclosure.
Figure 12:
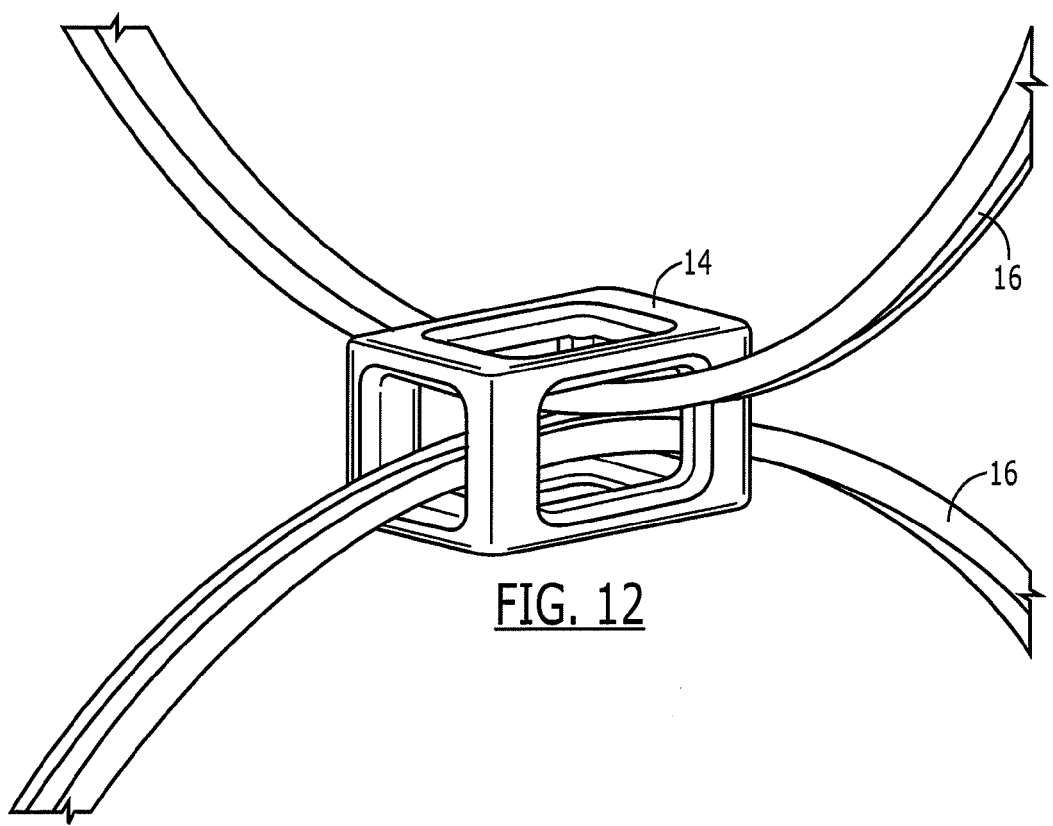
FIG. 12 is a fragmentary perspective view of the conductor spacer and the pair of ties of FIG. 11, which illustrates the manner in which the ties extend through the conductor spacer.

As indicated above, the conductor spacer 14 may also provide either a larger or a smaller separation between the first and second conductors depending upon the orientation of the conductor spacer relative to the first and second conductors. In the embodiment illustrated in FIGS. 9 and 10, the conductor spacer 14 is oriented such that a larger spacing is provided between the first and second conductors. In this regard, the first and second ties 16 extend through respective pairs of the openings 24 defined by the side faces 20 and oriented orthogonally relative to one another such that the first and second conductors that are secured to the conductor spacer 14 by the ties will be separated by the length of the spacer body as defined between the pair of end faces 18. Conversely, the embodiment of FIGS. 11 and 12 illustrates a conductor assembly 10 in which the first and second conductors are again secured to the spacer body in such a manner that the first and second conductors extend orthogonally relative to one another. However, the conductor spacer 14 is oriented relative to the first and second conductors such that the first and second conductors are separated by a smaller distance. In this regard, one of the ties 16 extends through a pair of openings 24 defined by a pair of opposed side faces 20, while the other tie extends through the openings 22 defined by the end faces 18. As such, the first and second conductors will be secured to the conductor spacer 14 in such a manner that the first and second conductors are separated from one another by the width of the end face 18. As before, the pairs of openings through which the ties 16 extend are oriented orthogonally to one another.

Figure 13:
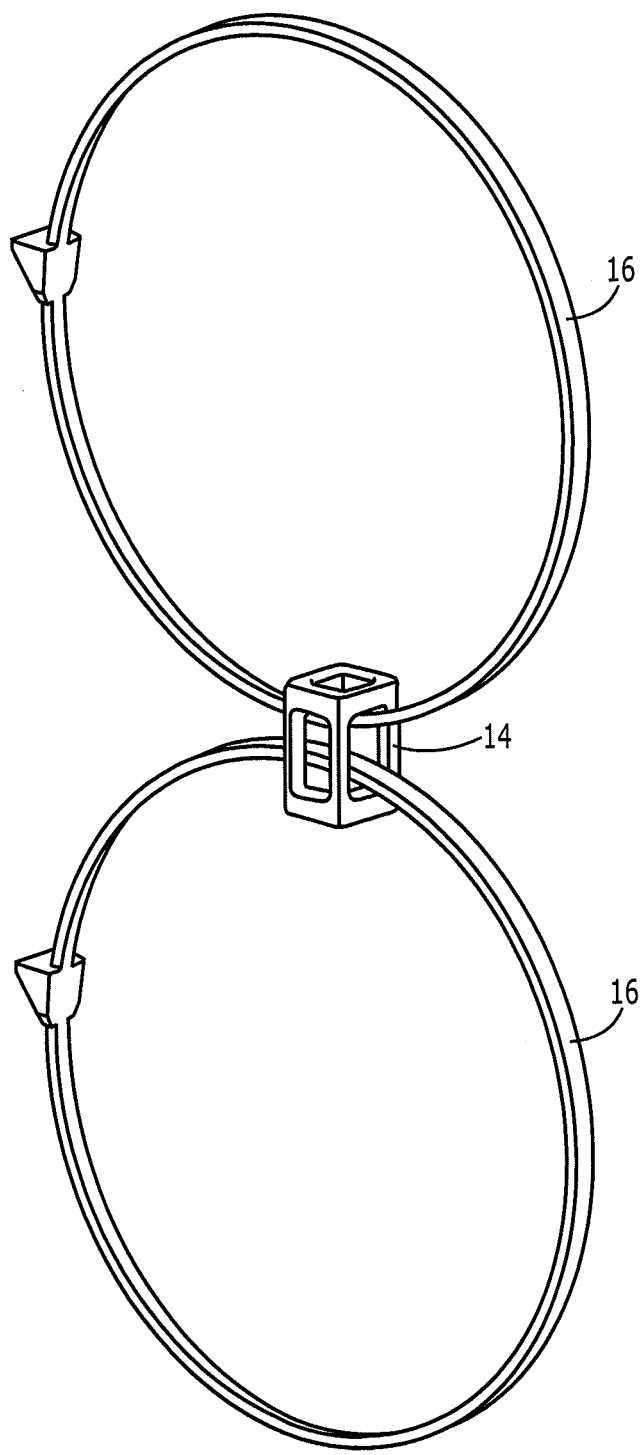
FIG. 13 is a perspective view of a conductor spacer and a pair of ties that are oriented relative to the conductor spacer to permit the respective conductors to be oriented in a parallel relationship with a larger separation between the conductors in accordance with one embodiment of the present disclosure.
Figure 14:
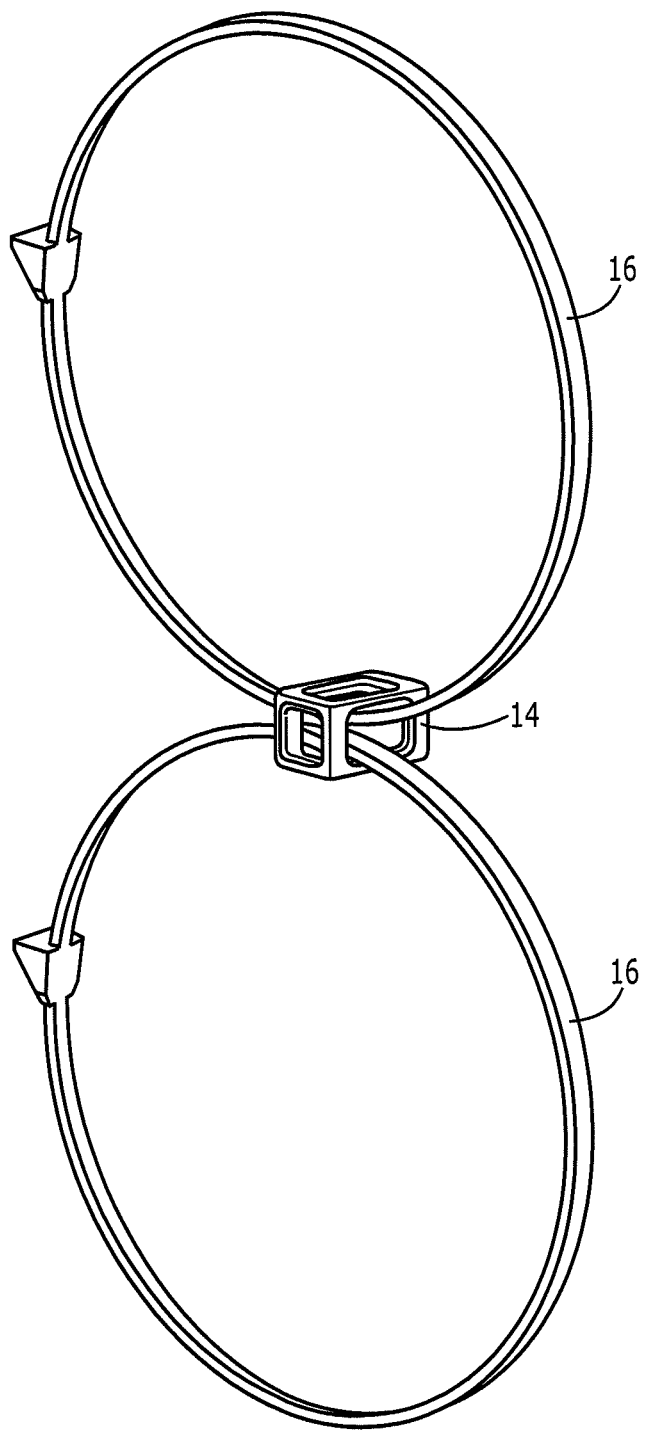
FIG. 14 is a perspective view of a conductor spacer and a pair of ties that are oriented relative to the conductor spacer to permit the respective conductors to be oriented in a parallel relationship with a smaller separation between the conductors in accordance with one embodiment of the present disclosure.

As also described above, the conductor assembly 10 of one embodiment of the present disclosure also permits conductors to be secured to the conductor spacer 14 in an instance in which the conductors are oriented parallel to one another. As shown in FIGS. 13 and 14, for example, the first and second ties 16 of a conductor assembly of this embodiment may extend through the same pair of openings, such as the same pair of openings 24 defined by opposed side faces 20 in the embodiment of FIG. 13 or the same pair of openings 22 defined by the end faces 18 in the embodiment of FIG. 14. As described above in conjunction with FIGS. 9-12, the conductor spacer 14 of this embodiment is also configured so as to provide different amounts of separation between the first and second parallel conductors. In the embodiment of FIG. 13, for example, the conductor spacer 14 is oriented with the ties 16 extending through openings 24 defined by the side faces 20 such that the first and second conductors are separated by a greater distance as defined by the length of the spacer body between the pair of end faces 18. In another embodiment as shown in FIG. 14, the ties 16 extend through the openings 22 defined by the end faces 18 such that the first and second conductors are separated from one another by a smaller distance as defined by the width of the end faces. Accordingly, the conductor spacer 14 of one embodiment facilitates the secure engagement of a pair of conductors while permitting different orientations and different spacings between the pair of conductors.

Figure 16:
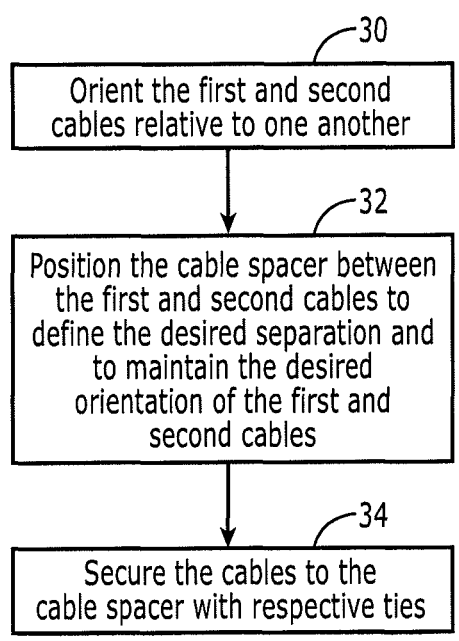
FIG. 16 is a flowchart illustrating the operations performed in accordance with one embodiment of the present disclosure.

As shown in operation 30 of FIG. 16, conductors may be separated and spaced by a conductor spacer 14 of one embodiment of the present disclosure by initially orienting the conductors 12 relative to one another and to the conductor spacer. For example, the first and second conductors 12 may be oriented relative to the conductor spacer 14 so as to have a parallel orientation with respect to one another or to have an orthogonal orientation with respect to one another. The conductor spacer 14 may also be positioned relative to the first and second conductors 12 so as to define a desired separation between the first and second conductors. See operation 32. In this regard, the conductor spacer 14 may include a spacer body that may provide either a larger or smaller separation between the first and second conductors 12 depending upon the orientation of the spacer body relative to the first and second conductors. The first and second conductors 12 may then be secured to the conductor spacer 14 by respective ties 16. See operation 34 of FIG. 10. As such, the conductor assembly 10 of one embodiment of the present disclosure permits a pair of conductors 12 to be securely positioned and oriented relative to one another, such as in a parallel orientation or an orthogonal orientation, and to be separated from one another by either a larger or a smaller distance by a conductor spacer 14.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conductor assembly comprising:
   a spacer body having a prismatic solid shape, wherein the spacer body comprises a pair of end faces and a plurality of side faces extending between the pair of end faces, and wherein the spacer body defines an internal cavity that is accessible via openings defined by each of the end faces and at least two of the side faces;
   first and second conductors that extend alongside the spacer body; and
   first and second ties for securing the first and second conductors, respectively, to the spacer body, wherein the first and second ties extend through a pair of openings and the internal cavity defined by the spacer body,
   wherein the spacer body is configured to provide a first spacing between the first and second conductors when the first and second ties extend through the openings defined by the side faces and encircle respective end faces and a second spacing, different than the first spacing, between the first and second conductors when the first and second ties extend through a pair of openings and encircle respective side faces.

2. A conductor assembly according to claim 1 wherein the spacer body defines openings in a pair of opposed side faces and a pair of openings extending about respective corners between a side face and an end face such that each of the pair of openings is defined partially by a side face and partially by an end face.

3. A conductor assembly according to claim 2 wherein the pair of openings are defined by a common side face and by the pair of opposed end faces.

4. A conductor assembly according to claim 1 wherein the first and second ties extend through respective pairs of openings with one pair of openings being orthogonally oriented relative to the other pair of openings.

5. A conductor assembly according to claim 1 wherein openings are defined by at least two side faces that are orthogonal to one another.

6. A conductor assembly according to claim 1 wherein the openings defined by the end faces are orthogonal to the openings defined by the at least two side faces.

7. A conductor assembly according to claim 1 wherein the end faces have a respective height and width, and wherein the height of the end faces differs from the width of the end faces.

8. A conductor spacer assembly comprising:
   a spacer body having a prismatic solid shape, wherein the spacer body comprises a pair of end faces and a plurality of side faces extending between the pair of end faces,
   wherein the spacer body defines an internal cavity that is accessible via openings defined by each of the end faces and at least two of the side faces,
   wherein the end faces have different dimensions than the side faces; and
   first and second ties that each extend through first and second openings and the internal cavity defined by the spacer body, each tie defining a closed loop configured to engage a respective conductor.

9. A conductor spacer assembly according to claim 8 wherein the spacer body defines openings in a pair of opposed side faces and a pair of openings extending about respective corners between a side face and an end face such that each of the pair of openings is defined partially by a side face and partially by an end face.

10. A conductor spacer assembly according to claim 9 wherein the pair of openings are defined by a common side face and by a pair of opposed end faces.

11. A conductor spacer assembly according to claim 8 wherein openings are defined by at least two side faces that are orthogonal to one another.

12. A conductor spacer assembly according to claim 8 wherein the openings defined by the end faces are orthogonal to the openings defined by the at least two side faces.

13. A conductor spacer assembly according to claim 8 wherein the end faces have a respective height and width, and wherein the height of the end faces differs from the width of the end faces.

14. A method of separating conductors comprising:
   positioning a spacer body having a prismatic solid shape between first and second conductors, wherein the spacer body comprises a pair of end faces and a plurality of side faces extending between the pair of end faces, and wherein the spacer body defines an internal cavity that is accessible via openings defined by each of the end faces and at least two of the side faces;
   securing the first and second conductors to the spacer body with first and second ties, respectively, that extend through a pair of openings and the internal cavity defined by the spacer body,
   wherein positioning the spacer body comprises providing a first spacing between the first and second conductors when the first and second ties extend through the openings defined by the side faces and encircle respective end faces and a second spacing, different than the first spacing, between the first and second conductors when the first and second ties extend through a pair of openings and encircle respective side faces.

15. A method according to claim 14 wherein securing the first and second conductors to the spacer body comprises positioning the first and second conductors in an orthogonal orientation and extending the first and second ties through respective pairs of openings with one pair of openings being orthogonally oriented relative to the other pair of openings.

16. A method according to claim 14 wherein the spacer body defines openings in a pair of opposed side faces and a pair of openings extending about respective corners between a side face and an end face such that each of the pair of openings is defined partially by a side face and partially by an end face.

17. A method according to claim 16 wherein the pair of openings are defined by a common side face and by the pair of opposed end faces.

18. A method according to claim 14 wherein positioning the spacer body comprises providing the spacer body such that the openings defined by at least two side faces are orthogonal to one another.

19. A method according to claim 14 wherein positioning the spacer body comprises providing the spacer body such that the openings defined by the end faces are orthogonal to the openings defined by the at least two side faces.

20. A method according to claim 14 wherein positioning the spacer body comprises providing the spacer body to have end faces with a respective height and width, and wherein the height of the end faces differs from the width of the end faces.

* * * * *